March 20, 1951 G. H. ERB 2,545,514
ANCHORING DEVICE
Filed Oct. 24, 1946 2 Sheets-Sheet 1

INVENTOR.
George H. Erb
BY
His ATTORNEY

March 20, 1951 G. H. ERB 2,545,514
ANCHORING DEVICE
Filed Oct. 24, 1946 2 Sheets-Sheet 2

INVENTOR.
George H. Erb
BY
his ATTORNEY

Patented Mar. 20, 1951

2,545,514

UNITED STATES PATENT OFFICE 2,545,514

ANCHORING DEVICE

George H. Erb, South Orange, N. J., assignor to Elastic Stop Nut Corporation of America, Union, N. J., a corporation of Delaware Application October 24, 1946, Serial No. 705,343

9 Claims. (Cl. 248—25)

The present invention relates to anchoring devices and has particular reference to anchoring devices for holding two or more parts in desired relation to each other and to a supporting or anchoring member.

The general object of the invention is the production of a device of the kind under consideration which is quickly and readily installed in assembled relation with a supporting member; which is of universal application to the extent that it may be mounted on supporting members, particularly metal plate members, of different thickness varying between substantial tolerance limits; which when installed is operative to hold a plurality of additional elements in desired position relative to each other; which is capable of permitting the relative position of the elements held by it to be adjusted; which will hold the elements retained by it in desired adjusted position relative to each other against vibratory forces and the like tending to move them out of adjustment; which is held in its installed position relative to the supporting member by means of one of the elements which is in turn held in position by the anchoring device; which is removable from its attachment to the supporting member upon the removal of one of the elements which the anchoring device holds; which is adapted to be held in assembled relation to the supporting member by the action of a threaded element constituting one of the elements which is in turn held by the anchoring member in adjusted relation with a second element held by the anchoring member; which is universal in its application to the extent that it may be held in assembled relation by, and in turn hold, threaded elements provided with different types and classes of threads; which is of integral one-piece construction; which if desired may be of material having electrical insulating properties and which will be cheap and relatively easy to manufacture.

The device is particularly adapted for use in radio instruments and the like for the mounting of coils in association with armatures which must be adjusted for position relative to the coils to adjust the frequency of the circuit of which the coil forms a part and in which the coil and armature must be shielded by a metallic shell which conveniently serves also as the supporting member for the coil assembly. By way of example the invention will therefore be described in conjunction with such use, but it is to be understood that the invention may within its intended scope be applied to numerous other specific uses.

For a better understanding of the detailed nature of the invention and the advantages to be derived from its use, reference may best be had to the ensuing portion of this specification taken in conjunction with the accompanying drawings in which suitable constructional assemblies of the invention are described and shown, particularly with reference to their utility in the radio art.

In the drawings, Fig. 1 is a top plan view of a device embodying the invention;

Figure 1:
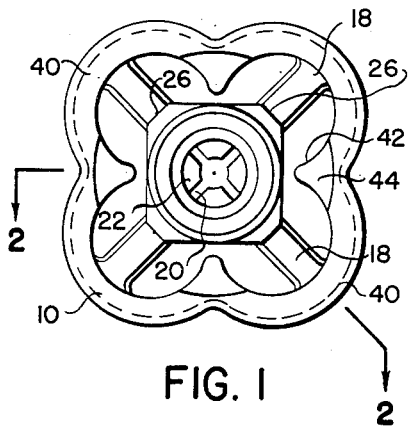
Figure 2:
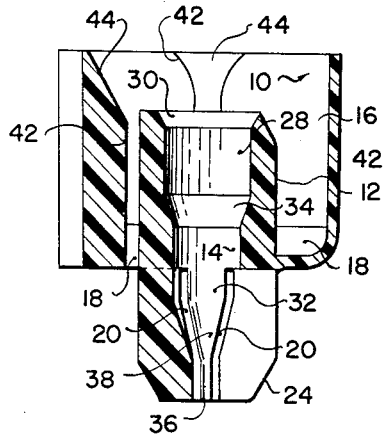
Fig. 2 is a longitudinal section taken on the line 2—2 of Fig. 1.
Figure 3:
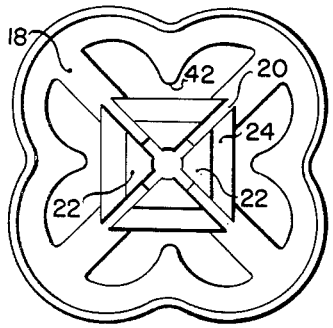
Fig. 3 is a bottom plan view of the device shown in Figs. 1 and 2.

Referring now more particularly to Figs. 1–3 the device comprises an integral body indicated generally at 10 formed at least in part by elastic material and preferably but not necessarily consisting of a body of molded elastic thread-impressionable plastic material, of which nylon is a preferred example.

The member 10 comprises a hollow central post portion 12 having a bore extending therethrough and indicated generally at 14. Concentrically arranged around the central post an outer fluted portion indicated generally at 16 is provided, the shell and post portions being connected and held in radially spaced relation by a plurality of radially extending connecting arms 18. These arms connect the shell and post at a place intermediate the ends of the latter and preferably although not necessarily are connected to the shell at the bottom end of the latter, as shown.

The outer surface of the portion of the post which extends beyond the lower end of the shell is non-circular in cross section and is preferably square as shown. This projecting or shank portion of the post is slotted by a plurality of longitudinally extending slots 20. In the form of the device shown the exterior of the shank portion is square in cross section and four diagonally spaced slots 20 are provided to thereby provide four projecting fingers 22 each having a flat outer surface and arranged in confronting pairs. At their free lower ends the fingers 22 are advantageously bevelled as indicated at 24.

The exterior surface of the part of the post situated within the shell above the arms 18 is also non-circular and is formed to provide a plurality of peripherally spaced abutments at a greater radial distance from the central axis of the device than the intervening portions of the periphery. In the examples shown the section of the outer surface of this part is generally square, with bevelled corners providing abutment surfaces 26 equally spaced around the perimeter.

The bore 14 of the post is of differential nature embodying a first cylindrical bore portion 28 in the top part of the post, advantageously terminating at the upper end of the post in the bevelled or flared portion 30. Intermediate the ends of the post a second bore portion 32 of smaller diameter is provided and which is connected with the portion 28 by means of the flaring bevel 34. At the free ends of the fingers a third bore portion 36 of still smaller diameter is provided which is in turn connected with the intermediate bore portion 32 by the flare or bevel section 38. For reasons which will hereinafter be explained the exact configuration of the bore as herein illustrated may be altered without departing from the principles of the invention or interfering with the proper functioning of the device.

The shell comprises what may be termed a fluted annulus which in the present example comprises four flutes 40 symmetrically arranged around the axis of the device and between which inwardly projecting abutment surfaces 42 are provided which at their upper ends are peripherally flared radially by means of the bevelled surfaces 44. It will be noted that the upper ends of the abutment surfaces 26 on the post are situated above the upper ends of the abutment surfaces 42 on the shell. This relation of the position of the abutment surfaces is advantageous for reasons hereinafter explained.

As indicated in Fig. 2, the outer surface of the shell is very slightly tapered longitudinally. This represents merely a slight amount of draft to facilitate removal of the device from a mold in the case of an article made by injection molding, diecasting or like process. This draft does not affect the function of the device.

Figures 7, 8:
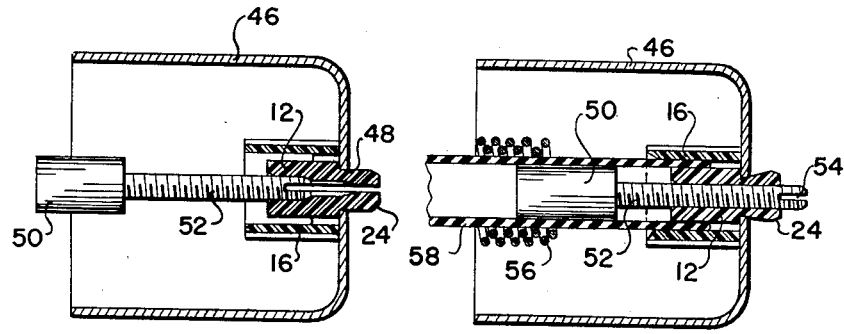
Fig. 7 is a central longitudinal section showing the device of Fig. 1 ready for assembly with a supporting member.
Fig. 8 is a view similar to Fig. 7 showing a device installed and with the parts held thereby in their adjusted positions.

Referring now more particularly to Figs. 7 and 8 the use of the device for supporting a radio coil is illustrated, it being assumed that the device is made of suitable plastic or other elastic thread-impressionable material having similar properties. Reference numeral 46 designates a sheet metal shielding cup or can of the usual kind employed in radio apparatus, the base of which is provided with a square aperture 48 of substantially the same dimensions as the shank part of the central post of the anchoring device. The adjustable armature of a radio coil is designated at 50 and is provided with an extended threaded shank 52 which at its outer end is preferably provided with a slot 54 for the reception of a screw driver.

The largest bore portion 28 of the post portion of the device is advantageously made substantially the same or very slightly less than the external or major diameter of the thread of the shank 52. The reason for making this bore portion slightly under the major diameter of the thread is to provide a push fit between the parts so that a preliminary or partial assembly can be made and the two parts handled as a unit before they are assembled with the supporting member. The bevelled end 30 of the bore aids as a guide surface. By hand or by use of any suitable tool for gripping the armature 50 the threaded shank is then screwed through the bore of the post to a position such as shown in Fig. 8. This produces two results. The thread first impresses a thread in the intermediate bore portion 32 of the post, this portion of the bore advantageously having a diameter approximately equal to the minor diameter of the thread and being restrained against radial displacement as a whole by virtue of its being an uninterrupted annulus and further by the radial support afforded by the shell and arms of the device and the walls of the aperture 48 of the supporting member 46. As the leading end of the threaded shank enters the unsupported shank portion of the anchoring device the radial pressure exerted by the threads in impressing themselves in the fingers of the shank tend to spread these fingers apart, and this tendency is accentuated when the threaded shank reaches the lower bevelled portion 38 of the bore. Thus as the threaded shank is driven through the bore it impresses a thread in a radially restrained section of the post and further impresses a thread in and spreads the fingers in the shank portion of the post to key or lock the body of the anchoring device to the supporting member.

Due to the elastic nature of the material of which the fingers of the shank portion are made it will be evident that the same anchoring member can be universally applied to supporting members having different wall thicknesses, varying in thickness within limits determined by the length of the fingers and the particular configuration of the bore of the post portion, especially with reference to the relative length and positioning of the different sections of the differential bore.

Preferably the bore, as shown, is unthreaded so that the thread-impressionable material of the post can accommodate threaded elements having different kinds or standards of threads and can also, within limits, even accommodate different sizes of threaded elements. In the assembly of small parts for example, a suitably proportioned unthreaded bore of elastic thread-impressionable material may accommodate and cooperate satisfactorily with, for example, a threaded element of either number 8 or number 10 size. Depending upon the specific nature of the material used for the post, one or more portions of the bore may be prethreaded for use with one specific size and type of threaded element, the important features being that the bore and the material of the post be so constituted that the threaded element will be gripped when installed to provide sufficient torque to restrain it from turning from its adjusted position and so that the threaded element when assembled will operate to spread the fingers to lock or key the device to the supporting member.

Because of the gripping action of the material in which the threads are impressed the threaded shank of the armature is effectively held against turning under vibratory or like forces so that the longitudinal position of the armature may readily be adjusted to desired location by the extent to which the shank is threaded through the anchoring member, and will be maintained in desired adjusted position relative to the member. For the maintenance of this gripping action over an extended period of time the radially restrained portion of the bore of the post is relatively more important than the finger portions, since the latter, particularly if made of a thermoplastic material, may eventually take a permanent set in their flared positions and cease to exert the gripping action on the threaded shank which is productive of the torque required to keep the latter from turning in the bore.

In the apparatus shown, the armature 50 operates in conjunction with a tubular coil member comprising a coil 56 wound around a cylindrical tube 58, usually made of paper, cardboard or other inexpensive material impregnated with a suitable resin or shellacked or varnished. Such tubes are ordinarily relatively stiff but possess a certain degree of elasticity permitting limited distortion radially without fracture.

The anchoring device serves to rigidly hold one end of the tubular form 58, which is inserted between the central post and the outer shell.

The form of the fluted shell is such that the walls have limited elastic movement radially in outward direction when force is applied to the spaced inwardly projecting abutments 42. The distance of these abutments from the axis of the device is related to the radial distance of the abutments 26 on the post from the axis, taking into account the thickness of the tube to be inserted between these abutments, so that in order to force the end of the tube into the space provided for it, slight radial distortion of the tube is required, tending to make it more nearly square in section than round. In order to do this without danger of fracturing the tube, it has been found advantageous to have the upper ends of the outer abutment surfaces 42 located above the upper ends of the inner abutments 26. With the abutments arranged in this way the first pressure exerted on the tube when it is inserted is external pressure tending to deform the tube at four corners, this external pressure being followed by internal radial pressure exerted between the corners by the abutments 26 which tends to flatten the sides of the tube into a more nearly square configuration. I have found that due to the slight deformation of the tube, coupled with the elastic action of the outer shell which maintains a radially exerted gripping force on the tube, a dependably rigid assembly between the tube and the anchoring device is obtained, while at the same time if desired the tube is readily removed for replacement by pulling it out from its frictionally gripped contact with the anchor. With the tube fixed in place final adjustment of the armature or core 50 is then readily accomplished to effect the desired tuning of the coil.

Tubes of the kind above referred to are usually required to be of relatively inexpensive nature which precludes among other things to hold the wall thickness of the tube to close tolerance. Because of the elastic nature of the fluted shell portion of the anchoring member, which permits the abutments on the shell to readily yield to a limited extent, it will be seen that the construction of the anchoring member is capable of accommodating and adequately holding in proper position tubular members of materially different thickness. The device is thus universal in its utility with respect to the mounting of tubular parts gripped between the shell and post portions as well as having universal utility with respect to the threaded elements engaging the post portion of the device.

Figures 9, 10:
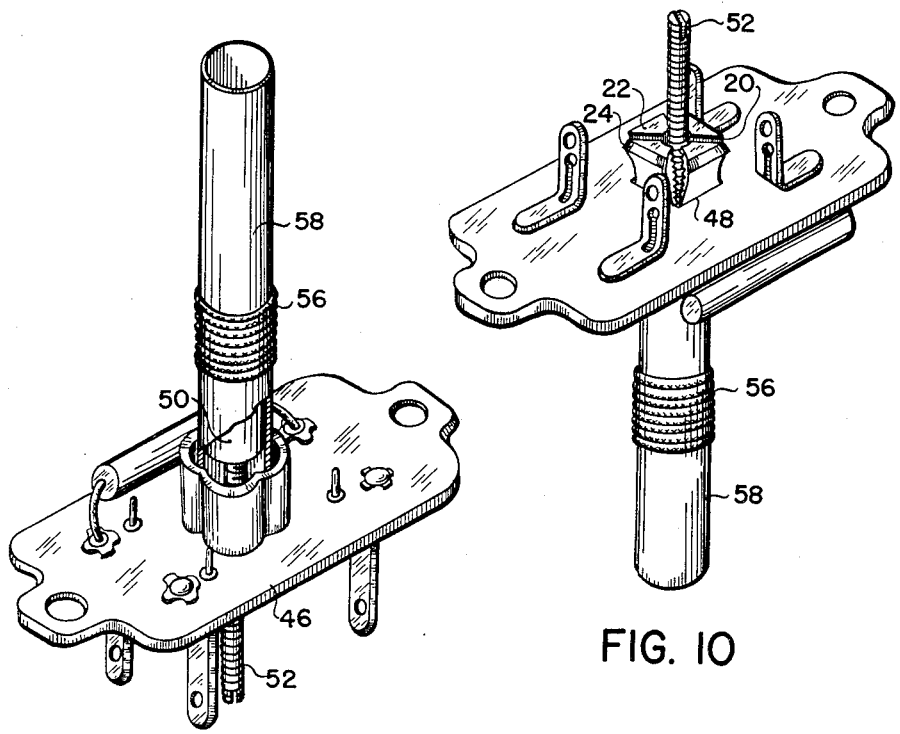
Fig. 9 is a perspective view partly in section showing the device installed on a plate supporting member.
Fig. 10 is a view similar to Fig. 9 but looking at the assembly from the opposite end.

In Figs. 9 and 10, the application of the device as a coil mounted on a flat plate 56 which carries other radio parts is illustrated, like parts of the device having like reference characters. Fig. 10 shows more clearly the square outline of the aperture 48 through which the shank portion of the body of the anchor is inserted. Preferably this aperture is made square although it can be of other non-circular configuration. The reason for making the aperture non-circular and of making the external perimeter of the shank portion of the device of configuration to match the non-circular aperture is that when the device is assembled the formation of the threads by impression in the bore of the post creates a substantial torque and the non-circular mounting is required to prevent the body of the device from turning relative to the supporting member. While such turning movement might be prevented during assembly by holding the body with a suitable tool during the assembling operation this would involve undesirable complication and further the device should be positively restrained against turning movement after its assembly in order to permit the threaded shank to be turned to adjust the position of the armature, without danger of having the whole assembly of parts turn relative to the supporting member.

Figure 4:
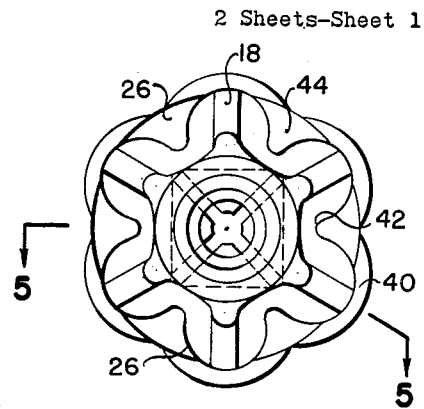
Fig. 4 is a view similar to Fig. 1 of another form of device embodying the invention.
Figure 5:
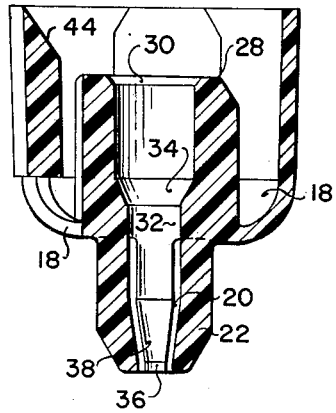
Fig. 5 is a longitudinal section taken on the line 5—5 of Fig. 4.
Figure 6:
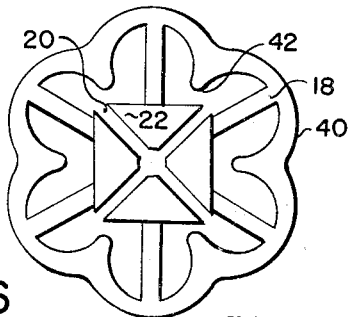
Fig. 6 is a bottom plan view of the device shown in Figs. 4 and 5.

Referring now to Figs. 4-6 there is shown another embodiment of the device which differs from that shown in Figs. 1-3 substantially only in the configuration of the outer fluted shell. Like portions of the device bear corresponding reference numerals, and the details of construction of the major part of the structure and their manner of functioning will be apparent from the description of the embodiment shown in Fig. 1. In the present case the outer shell is provided with six flutes 40 and abutments 42, and the inner post is provided with six spaced abutments 26, the inner and outer abutments alternating peripherally as in the case of the sets of four abutments shown in Fig. 1. The essential difference between the two forms of the device is that the one illustrated in Fig. 4 provides more points of frictional pressure support between the anchoring body of the tube than does the one shown in Fig. 1.

From the foregoing it will be apparent that many different variations in specific design and configuration may be employed within the scope of the invention and that different material can also be employed. The device does not necessarily have to be a homogeneous body of the same material. In order to secure the maximum advantage from the standpoint of universality of use with different threaded elements, the use of a post portion of unthreaded thread-impressionable plastic material is more desirable but such construction and material need not be adhered to. This portion may be made of metal and perform certain desirable functions of the device. Also the nature of the shell portion of the device is such that this may be made of elastic metal, which for example might be made in the form of an insert placed in a suitable die cavity and to which a plastic post section would be molded. Thus the construction may be of homogeneous or composite nature, of a wide variety of materials, but for a device having the greatest scope of utility the use of a homogeneous body molded from plastic material is to be preferred. Many variations in addition to those mentioned above will undoubtedly occur to those skilled in the art and the invention is accordingly to be considered as embracing all devices falling within the scope of the appended claims.

What is claimed is:

1. An anchoring device having a body comprising a hollow post portion and a shell portion surrounding a part of said post portion and connected thereto in radially spaced relation, means comprising abutments on said portions for frictionally gripping a hollow element inserted in the space between the post portion and the surrounding shell portion, and means for securing said body to an apertured supporting member comprising a plurality of fingers forming a part of said post portion extending axially beyond said shell portion and formed to be engaged and laterally spread apart by an element inserted into said hollow post portion and forced between said fingers.

2. An anchoring device having a body comprising a hollow post portion and a shell portion surrounding a part of said post portion and connected thereto in radially spaced relation, means comprising abutments on said portions for frictionally gripping a hollow element inserted in the space between the post portion and the surrounding shell portion, and means for securing said body to an apertured supporting member comprising a plurality of fingers forming a part of said post portion extending axially beyond said shell portion and formed to be engaged and laterally spread apart by a threaded element, said post portion being formed of thread-impressionable elastic material to have a thread impressed therein by said threaded element for gripping the latter.

3. An anchoring device having a body comprising a hollow post portion and a shell portion surrounding a part of said post portion and connected thereto in radially spaced relation, means comprising abutments on said portions for frictionally gripping a hollow element inserted in the space between the post portion and the surrounding shell portion, and means for securing said body to an apertured supporting member comprising a plurality of fingers forming a part of said post portion extending axially beyond said shell portion and formed to be engaged and laterally spread apart by an element inserted into said hollow post portion and forced between said fingers, said fingers forming a shank portion of non-circular external perimeter adapted to be inserted through an aperture of similar outline in said supporting member and to prevent relative turning movement between the parts after they are assembled.

4. An anchoring device for holding a tubular element and a core element in adjusted position within the tubular element, comprising a body providing a hollow post portion and a shell portion encircling said post portion and connected at one of its ends to said post portion by a plurality of radially extending arms, said post portion having peripherally spaced longitudinally extending external abutments thereon, said shell portion having peripherally spaced longitudinally extending internal abutments thereon for the reception between them and frictional gripping of said tubular element, said hollow post portion providing a bore for engagement and support of said core element, and means forming a part of said body for securing the same to a supporting member.

5. In an anchoring device a hollow post portion of thread-impressionable elastic material terminating at one of its ends in a shank portion having a polygonal external cross-sectional perimeter longitudinally slotted at the corners of the polygon to provide a plurality of axially extending fingers, said post portion having a differential bore including a first section having a diameter for thread impressing engagement with a threaded element of predetermined diameter and a second section in said shank portion of smaller diameter than said first section for causing said fingers to be laterally spread apart by said threaded element when it is advanced beyond said first section.

6. In an anchoring device a hollow post portion of thread-impressionable elastic material terminating at one of its ends in a shank portion having a square external cross-sectional perimeter longitudinally slotted at the corners of the square to provide two pairs of mutually confronting axially extending fingers, said post portion having a differential bore including a first section having a diameter for thread impressing engagement with a threaded element of predetermined diameter and a second section in said shank portion of smaller diameter than said first section for causing said fingers to be laterally spread apart by said threaded element when it is advanced beyond said first section.

7. An anchoring device having a homogeneous body of elastic plastic material, said body comprising a hollow post portion, a shell portion surrounding a part of said post portion, and a plurality of radially extending arms connecting said portions in radially spaced relation, said shell portion having longitudinally extending peripherally spaced internal abutments located peripherally between the places of juncture of said arms with said shell portion, said post portion having a plurality of longitudinally extending peripherally spaced external abutments located in peripherally staggered relation with respect to the abutments on the shell portion, said hollow post portion having a shank portion extending axially beyond said arms and adapted to be inserted through an aperture in a supporting member, said shank portion comprising a plurality of fingers providing a non-circular external cross section for engagement with an aperture of similar outline, and said hollow post portion further providing a differential bore dimensioned to cause said fingers to be spread when a threaded element is screwed through the bore.

8. An anchoring device having a body comprising a hollow post portion and a shell connected thereto in radially spaced relation, means comprising internal abutments on said shell portion for frictionally gripping a hollow element inserted in said shell portion, and means for securing said body to an apertured supporting member comprising a plurality of fingers forming a part of said post portion extending axially beyond said shell and formed to be engaged and laterally spread apart by an element inserted into said hollow post portion and forced between said fingers.

9. An anchoring device having a body comprising a hollow post portion and a shell connected thereto in radially spaced relation, means comprising internal abutments on said shell portion for frictionally gripping a hollow element inserted in said shell portion, said post portion being formed of thread impressionable elastic material for gripping a threaded element screwed into the bore of the post portion to impress a thread therein, and means for securing said body to an apertured supporting member comprising a plurality of fingers forming a part of said post portion extending axially beyond said shell and formed to be engaged and laterally spread apart by the threaded element screwed into the bore of the post portion and forced between said fingers.

GEORGE H. ERB.

REFERENCES CITED

The following references are of record in the file of this patent:

UNITED STATES PATENTS

| Number | Name | Date |
|---|---|---|
| 1,106,761 | Weikert et al. | Aug. 11, 1914 |
| 1,882,021 | Lauer | Oct. 11, 1932 |
| 2,356,934 | Ketcham | Aug. 29, 1944 |

FOREIGN PATENTS

| Number | Country | Date |
|---|---|---|
| 302,432 | Great Britain | 1928 |